United States Patent [19]

Glaser

[11] 3,906,211

[45] Sept. 16, 1975

[54] THREE-WORD ADDER CARRY PROPAGATION

[75] Inventor: Arthur Barry Glaser, East Orange, N.J.

[73] Assignee: Bell Telephone Laboratories, Incorporated, Murray Hill, N.J.

[22] Filed: May 23, 1974

[21] Appl. No.: 472,521

[52] U.S. Cl. .................... 235/175

[51] Int. Cl.² .................... G06F 7/50; G06F 7/385

[58] Field of Search .................... 235/175

[56] References Cited

UNITED STATES PATENTS

| | | | |
|---|---|---|---|
| 3,053,452 | 9/1962 | Kilburn et al. | 235/175 |
| 3,371,195 | 2/1968 | Bolt et al. | 235/175 |
| 3,717,755 | 2/1973 | Briley | 235/175 |
| 3,757,098 | 9/1973 | Wright | 235/175 |

*Primary Examiner*—R. Stephen Dildine, Jr.
*Attorney, Agent, or Firm*—Ronald D. Slusky

[57] ABSTRACT

Carry-line propagation circuitry is implemented in a three-word adder by allocating equal weights to the two carry-out bits from each adder stage. In one illustrative embodiment of the invention, the three-word adder comprises one-bit adder stages. In another illustrative embodiment, the three-word adder comprises two-bit adder stages.

22 Claims, 9 Drawing Figures

THREE-WORD ADDER CARRY PROPAGATION

BACKGROUND OF THE INVENTION

The present invention relates to binary adders and in particular, to high speed carry propagation in circuits for adding three or more large numbers or words.

One of the principal considerations in the design of large high speed parallel adders is minimization of carry propagation time. In ripple-carry propagation arrangements, for example, a carry-out bit is generated in each adder stage in response to the summand (addend and augend) bits applied to that stage and the carry-in bit applied from the next lower order stage. Thus in ripplecarry arrangements, final determination of whether the value of the carry-out bit from a particular stage is to be "0" or "1" is delayed until successive like determinations can be made in each lower order stage. In applications involving addition of large (e.g. 32-bit) numbers, or words, this delay may be intolerable. Such applications may include, for example, digital filters and other real-time signal processors.

Accordingly, faster carry propagation techniques have been devised. In so-called carry look-ahead arrangements, each adder stage determines the value of its own carry-in bit by examining the summand bits applied not only to that stage but to each other lower order stage as well. A principal drawback of these arrangements is that when the words to be added are large, the amount of hardware required is prohibitive.

Other known carry propagation arrangements divide the summand bits of each word into groups. Corresponding bit groups from each word are added together to generate intermediate sum and carry-out bits concurrently for all groups. The intermediate sum and carry-out bits are then recombined to determine the final sum. This technique is somewhat slower than carry look-ahead, for example, but realizes substantial savings in hardware thereover.

Yet another known carry propagation arrangement is the type disclosed in Kilburn et al. U.S. Pat. No. 3,053,452, issued Sept. 11, 1962. In a two-word adder stage, the carry-out bit value is independent of the carry-in bit value for two of the summand bit value combinations and is the same as the carry-in bit value for the other two summand bit value combinations. Thus in Kilburn, carry propagation circuitry in each stage of the adder examines the summand bits applied thereto. If the summand bit values are both 0 or are both 1, a carry-out bit of value 0 or 1, respectively, is immediately generated. Since for the other possible summand bit value combinations, 0 & 1 and 1 & 0, the carry-out bit has the same value as the carry-in bit, a very low impedance conducting path, referred to as a "carry transmission line," or more simply, "carry line," is established between the carry-in and carry-out leads of the adder stage. Thus if the carry-in bit value is 1, for example, a carry-out bit having the value 1 is immediately propagated to the next higher order stage. Since carry bits in a Kilburn adder are propagated from one stage to the next along very low impedance conducting paths, and are not regenerated, very little carry propagation delay is incurred.

The carry-line propagation technique described by Kilburn et al advantageously provides shorter propagation delay then most ripple-carry and group-carry arrangements, for example. And although the carry-line propagation technique is not, in general, as fast as carry look-ahead, it requires far less circuitry than carry look-ahead when large words are to be added. Moreover, the stages in a carry-line adder are identical for every stage. Group-carry and carry look-ahead stages are typically not identical. Thus carry-line adders are more readily amenable to inexpensive integrated circuit fabrication It would be desirable to extend the above-described advantages of the carry-line propagation technique to adders for adding three or more words. In a three-word adder, for example, corresponding bits from each of three words are applied concurrently to each adder stage along with two carry-in bits. A sum bit and first and second carry-out bits are generated by each stage in response to the three summand and two carry-in bits. Conventionally, the first carry-out bit has a weight of twice that of the sum bit and is extended to the immediately next higher order stage. The second carry-out bit, which conventionally has a weight of four times that of the sum bit, is extended to the second next higher order stage.

Thus carry-line propagation circuitry for a three-word adder would include circuitry for examining the three summand bits applied to each stage. To the extent that one or both carry-out bit values could be determined independently of the carry-in bit values, such carry-out bits would be immediately generated. Otherwise, an appropriate carry-line path or paths would be established between the carry-in and carry-out leads to propagate the carry information.

However, the above-described conventional weight assignment scheme for the two carry-out bits (i.e. two- and four-times the sum weight, respectively) precludes straightforward extension of the carry-line propagation technique to three-word adders. This is because for some summand bit value combinations, such as when all three summand bit values are 1, the carry-out bit values are neither independent of the two carry-in bit values nor the same as the value of a selected one of them.

SUMMARY OF THE INVENTION

Accordingly, a general object of the present invention is to provide an improved three-word parallel adder.

A more particular object of the invention is to provide carry-line propagation circuitry for three-word adders.

I have discovered that these as well as other objects can be achieved by avoiding the above-described conventional carry-weight assignment scheme for three-word adders. In accordance with the invention, an unorthodox carry-weight assignment scheme is adopted in which both the first and second carry-out bits from each adder stage have equal weight — that weight being twice the weight of a sum bit provided by the stage. Both carry-out bits are extended to the immediately next higher order stage. I have found that when this carry-weight assignment scheme is implemented in each stage of a three-word adder, the value of each carry-out bit is either independent of the values of the carry-in bits applied to the stage or is the same as a selected one of the carry-in bit values. Implementation of carry-line propagation in the three-word adder is thus made possible.

A first illustrative three-word adder embodying the principles of the invention comprises a plurality of one-bit adder stages. That is, each stage of the adder receives one bit from each of the three summand words to be added. When the above-described carry-weight assignment scheme of the present invention is employed in a one-bit adder stage, the value of one or the other of the carry-out bits provided by the stage can always be determined solely on the basis of its total summand weight, i.e. the number of the summand bits applied to the stage which have the value 1. Thus, circuitry within each stage operates in response to the total summand weight to immediately generate one carry-out bit on an associated carry-out lead.

Circuitry within each stage further operates in response to the total summand weight to establish a carry-line path between a selected one of the carry-in leads of the stage and the carry-out lead on which no bit has yet been generated. Thus, when the two carry-in bits for the stage are applied thereto from the next lower order stage, a selected one of the carry-in bits is propagated through the stage to provide the other carry-out bit. At the same time, the carry-in bits applied to each stage are combined with the three summand bits to generate a sum bit for the stage.

A second illustrative three-word adder embodying the principles of the invention comprises a plurality of two-bit adder stages. That is, each stage of the adder receives two adjacent bits from each of the three summand words. In a binary word, the weight of any bit is twice that of an adjacent bit of lesser significance. Thus, the total summand weight is determined by doubling the number of the more significant summand bits which have the value 1, and adding it to the number of the less significant summand bits which have the value 1.

When the carry-weight assignment scheme of the present invention is employed in a two-bit adder stage, at least one carry-out bit value can always be determined solely on the basis of the total summand weight. For some magnitudes of the total summand weight, both carry-out bit values can be so determined. Thus circuitry within each stage operates in response to the total summand weight to immediately assign values to one or both carry-out bits on an associated carry-out lead or leads.

Circuitry within each stage further operates in response to the total summand weight to establish an appropriate carry-line path if one of the carry-out bit values cannot be determined solely on the basis of the total summand weight. Thus, when the two carry-in bits for each stage are applied thereto from the next lower order stage, a selected one of the carry-in bits is propagated through the stage to provide the carry-out bit not previously generated. In addition, the carry-in bits applied to each stage are combined with the six summand bits applied thereto to generate two sum bits for the stage, the second sum bit having twice the weight of the first sum bit.

BRIEF DESCRIPTION OF THE DRAWING

The invention may be clearly understood from a consideration of the following detailed description and accompanying drawing in which:

FIG. 4 may be arranged above FIG. 3 to depict an illustrative full adder stage for the adder of FIG. 1;

DETAILED DESCRIPTION

Figure 1:
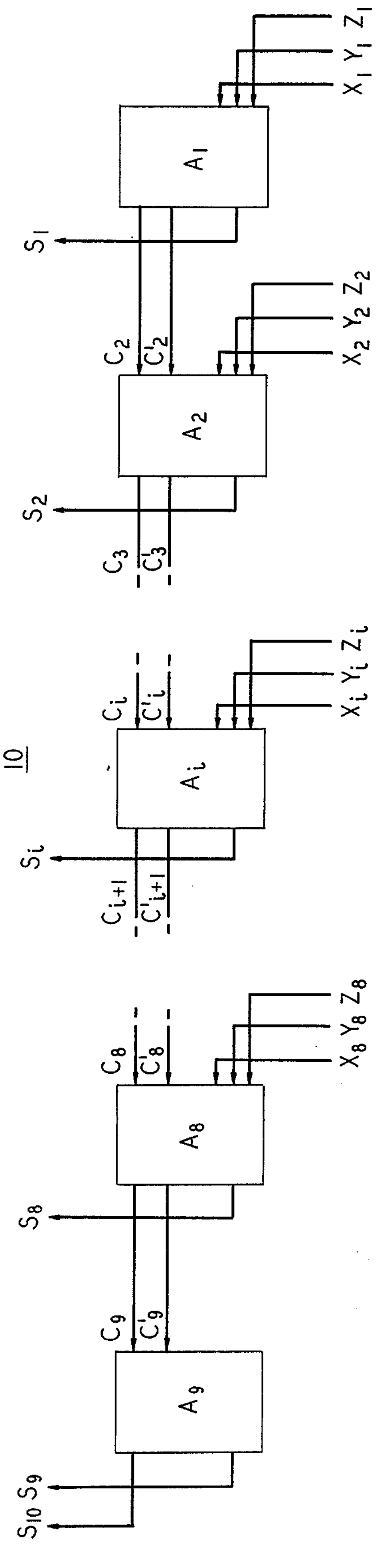
FIG. 1 is a block diagram of an illustrative three-word adder using one-bit adder stages to implement the carry-weight assignment scheme of the present invention.

Three-word adder 10 in FIG. 1 is adapted to concurrently add three words, each illustratively of eight-bit length. Adder 10 includes eight main adder stages $A_1$ through $A_8$ and a spill-over stage $A_9$. Stages $A_3$ through $A_7$ are not shown in FIG. 1 but rather are generically represented by adder stage $A_i$. Of course, it will be appreciated that adder 10 may have as many stages as needed, depending on the number of bits in the summand words to be added.

The three words added by adder 10 comprise summand bits $x_1 \ldots x_8$, $y_1 \ldots y_8$ and $z_8 \ldots z_8$, respectively. Bits $x_1$, $y_1$ and $z_1$, the least significant bits of the three input words, are applied to stage $A_1$ as its summand bits. Bits $x_2$, $y_2$ and $z_2$ are applied to stage $A_2$ as its summand bits, and so forth. First and second carry-in bits, provided in accordance with the invention in a manner described hereinbelow, are also applied to each adder stage with the exception, of course, of stage $A_1$. Thus, for example, first and second carry-in bits $C_i$ and $C_i'$ are applied to stage $A_i$, and first and second carry-in bits $C_9$ and $C_9'$ are applied to spill-over stage $A_9$.

Each adder stage combines the summand and carry-in bits applied thereto to generate a sum bit. Stage $A_1$ generates the least significant sum bit $S_1$; stage $A_2$ generates the second-to-least significant sum bit $S_2$, and so forth.

Each adder stage also provides two carry-out bits. In conventional three-word adders, the two carry-out bits provided by each adder stage have unequal weights respectively equal to two- and four-times the weight of the sum bit generated by that stage. Thus in conventional adders, the first carry-out bit from a given stage is applied to the next higher order stage while the second carry-out bit is applied to the stage beyond that. As discussed above, this conventional carry-weight assignment scheme precludes implementation of carry-line propagation in three-word adders.

However, I have discovered that carry-line propagation can be implemented in three-word adders by avoiding the above-described conventional carry-weight assignment scheme and adopting in its stead, an unorthodox scheme in which both carry-out bits from a given stage have equal weight - namely, twice the sum bit weight. In this arrangement, both carry-out bits are applied to the immediately next higher order stage.

In FIG. 1, therefore, both the first and second carry-in bits $C_i$ and $C_i'$ for adder stage $A_i$, for example, comprise the carry-out bits provided from the next lower order adder stage $A_{i-1}$ (not shown). Carry bits $C_i$ and $C_i'$ each have a weight equal to twice the weight of sum bit $S_{i-1}$ generated by stage $A_{i-1}$, i.e. the same weight as sum bit $S_1$.

Each stage of adder 10 includes circuitry implementing carry-line propagation in accordance with the invention. The carry-line propagation circuit within each adder stage operates in response to the total weight of the summand bits applied to that stage, i.e. the number of summand bits which have the value 1. If the value of a carry-out bit can be determined solely on the basis of the total summand weight, i.e. independently of the carry-in bit values, that carry-out bit is immediately generated. Otherwise, the carry-line propagation circuit establishes a carry-line path along which one of the carry-in bits applied to the stage is routed to an appropriate carry-out lead thereof, thereby providing the carry-out bit in question.

More specifically, Table I shows the values of sum bit $S_i$ and carry-out bits $C_{i+1}$ and $C'_{i+1}$ which are provided by adder stage $A_i$ in response to various combinations of the input, i.e. summand and carry-in, bits applied thereto. The symbol $\Sigma_i$ in Table I represents the total summand weight for adder stage $A_i$, i.e. the number of the summand bits $x_i$, $y_i$ and $z_i$ which have the value 1.

TABLE I

| $\Sigma_i$ | Inputs $C_i$ | $C_i'$ | Total Input Weight | $S_i$ | Outputs $C_{i+1}$ | $C_{i+1}'$ | Carry Line Rules |
|---|---|---|---|---|---|---|---|
| 0 | 0 | 0 | 0 | 0 | 0 | 0 | $C_{i+1}=C_i'$ |
| 0 | 1 | 0 | 1 | 1 | 0 | 0 | $C_{i+1}'=$"0" |
| 0 | 1 | 1 | 2 | 0 | 1 | 0 | |
| 1 | 0 | 0 | 1 | 1 | 0 | 0 | $C_{i+1}=C_i$ |
| 1 | 1 | 0 | 2 | 0 | 1 | 0 | $C_{i+1}'=$"0" |
| 1 | 1 | 1 | 3 | 1 | 1 | 0 | |
| 2 | 0 | 0 | 2 | 0 | 1 | 0 | $C_{i+1}=$"1" |
| 2 | 1 | 0 | 3 | 1 | 1 | 0 | $C_{i+1}'=C_i'$ |
| 2 | 1 | 1 | 4 | 0 | 1 | 1 | |
| 3 | 0 | 0 | 3 | 1 | 1 | 0 | $C_{i+1}=$"1" |
| 3 | 1 | 0 | 4 | 0 | 1 | 1 | $C_{i+1}'=C_i$ |
| 3 | 1 | 1 | 5 | 1 | 1 | 1 | |

It will be noted from Table I that when only one of the carry-in bits provided to stage $A_i$ has the value 1, that bit is always the first carry-in bit $C_i$. The second carry-in bit $C_i'$ only has the value 1 if both carry-in bits are to have the value 1. Similarly, where a single one of the carry-out bits $C_{i+1}$ and $c_{i+1}'$ is to have the value 1, that bit is always the first carry-out bit $C_{i+1}$. (It may also be noted that since the total input weight for stage $A_1$ is never more than 3, its second carry-out bit $C_2'$ always has the value 0. Thus lead $C_2'$ in adder 10, shown for completeness in FIG. 1, can be eliminated, if desired.)

As indicated in the "Carry Line Rules" column of Table I, for each value of total summand weight, $\Sigma_i$, the value of one of the carry-out bits $C_{i+1}$ and $C_{i+1}'$ is independent of the values of carry-in bits $C_i$ and $C_i'$, while the value of the other carry-out bit is the same as one of the carry-in bit values. In particular, when $\Sigma_i = 0$, 1, 2 and 3, $C_{i+1} = C_i'$, $C_i$, 1 and 1, respectively, and $C_{i+1}' = 0$, 0, $C_i'$ and $C_i$, respectively. Thus, as soon as the summand bits $x_i$, $y_i$ and $z_i$ are applied to stage $A_i$, one of the carry-out bits is immediately generated by stage $A_i$ while the other is provided by establishing an appropriate carry-line path in that stage.

Figure 2:
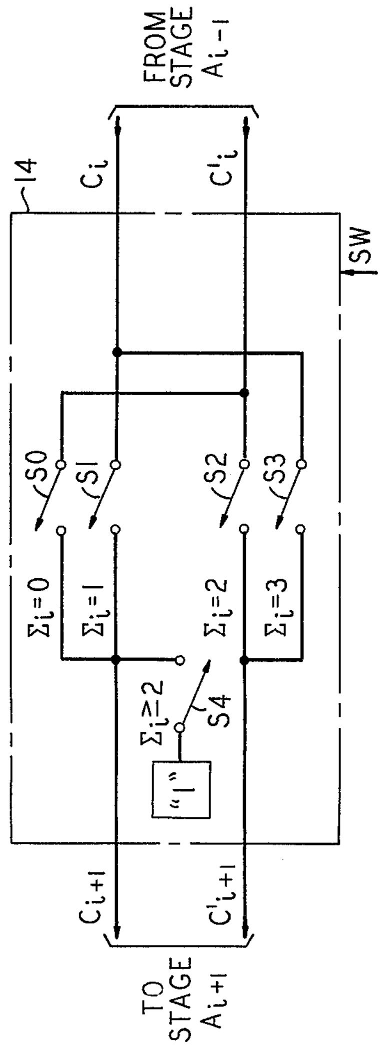
FIG. 2 is a functional schematic diagram of a carry-line propagation circuit in accordance with the present invention for use in the stages of the adder of FIG. 1.

In this regard attention is directed to FIG. 2, which is a functional schematic diagram of an illustrative carry-line propagation circuit 14 for adder stage $A_i$. Circuit 14 receives first and second carry-in bits from adder stage $A_{i-1}$ (not shown) on leads $C_i$ and $C_i'$, respectively. In turn, circuit 14 provides first and second carry-out bits to adder stage $A_{i+1}$ (not shown) on leads $C_{i+1}$ and $C_{i+1}$, respectively.

Carry-line propagation circuit 14 comprises switches S0, S1, S2, S3 and S4. Switches S0 . . . S3 are controlled by a signal on lead SW indicative of the valve of $\Sigma_i$. In particular, when $\Sigma_i = 0$, switch S0 is closed, establishing a carry-line path between carry-in lead $C_i'$ and carry-out lead $C_{i+1}$. Thus as per Table I, the second carry-in bit $C_i'$ provided to stage $A_i$ is routed therethrough and provided as its first carry-out bit $C_{i+1}$. Table I further indicates that carry-out bit $C_{i+1}'$ is to have the value 0 when $\Sigma_i = 0$. Accordingly, no connection is made to lead $C_{i+1}'$. The continuing quiescent condition on lead $C_{i+1}'$ provides the second carry-out bit $C_{i+1}'$ with the value 0.

When $\Sigma_i = 1$, switch S1 is closed. Carry-in bit $C_i$ is routed through stage $A_i$ and provided as carry-out bit $C_{i+1}$. No connection is made to lead $C_{i+1}'$, again providing carry-out bit $C_{i+1}'$ with the value 0.

When $\Sigma_i = 2$, switch S2 is closed. Carry-in bit $C_i'$ is routed through stage $A_i$ and provided as carry-out bit $C_{i+1}'$. Switch S4 is also closed when $\Sigma_i = 2$, thereby providing a signal on lead $C_{i+1}$ indicating that carry-out bit $C_{i+1}$ has the value 1. Finally when $\Sigma_i = 3$, switches S3 and S4 are both closed. Thus carry-in bit $C_i$ is routed through stage $A_i$ and provided as carry-out $C_{i+1}'$, while carry-out bit $C_{i+1}$ is, again, 1.

Figure 3:
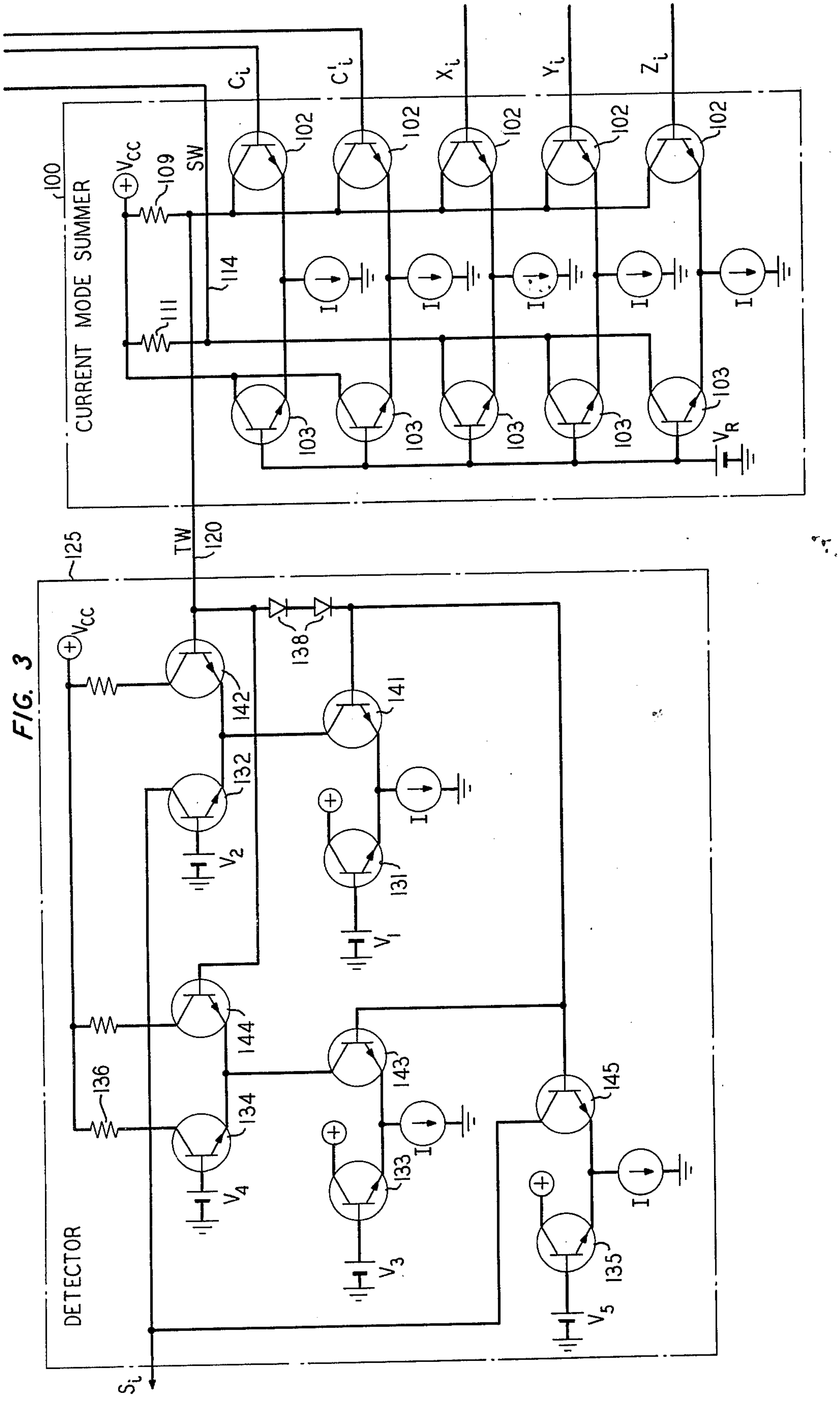
FIG. 3 is a circuit diagram of an illustrative sum circuit for use in the stages of the adder of FIG. 1.
Figures 4, 5:
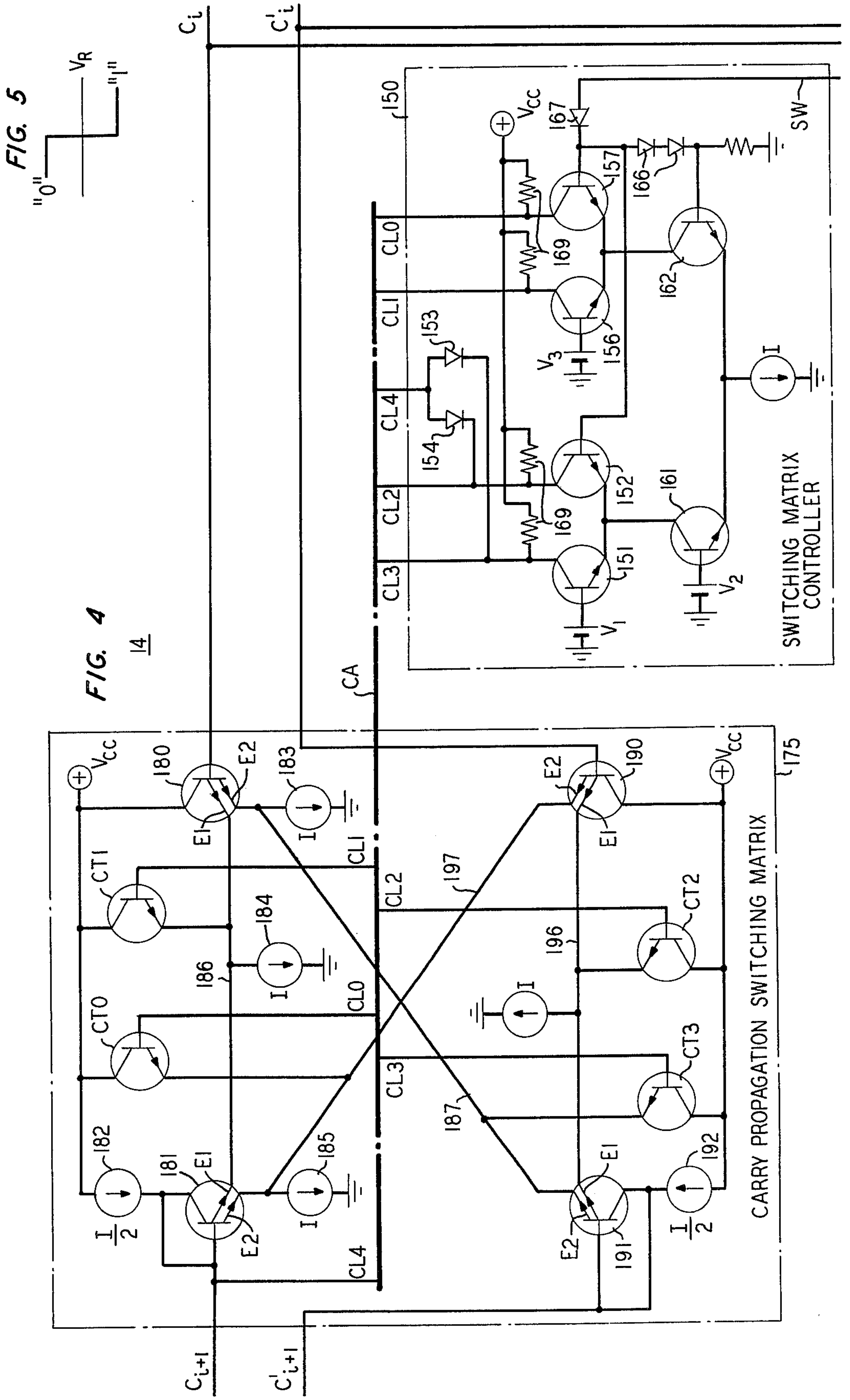
FIG. 4 is a circuit diagram of an illustrative implementation of the carry-line propagation circuit functionally depicted in FIG. 2.
FIG. 5 shows the relationship between the 0 and 1 levels of logic signals used in the circuitry of FIGS. 3 and 4.

Of course in any adder, carry bits are extended from one stage to the next for the purpose of determining the proper sum bit value for each stage. Thus FIG. 3 depicts illustrative sum circuitry for combining the three summand and two carry-in bits applied to stage $A_i$ to generate its sum bit $S_i$. FIG. 4 depicts circuitry implementing the functional schematic diagram of carry-line propagation circuit 14 in FIG. 2. FIG. 4 may be arranged above FIG. 3 to show a complete illustrative embodiment for adder stage $A_i$. Each other stage of adder 10 may be substantially identical to stage $A_i$. Thus only stage $A_i$ is shown and described in detail herein.

The sum circuitry of FIG. 3 comprises current mode summer 100 and detector 125. Summer 100 receives the five input bits applied to stage $A_i$, i.e. summand bits $x_i$, $y_i$ and $z_i$ and carry-in bits $C_i$ and $C_i'$, and in response thereto, generates signal TW on lead 120. Signal TW takes on one of six voltage values indicative of the total input weight for stage $A_i$, i.e. the number of its five input bits $x_i$, $y_i$, $z_i$, $C_i$ and $C_i'$ which have the value 1. Detector 125 operates in response to signal TW to generate the appropriate sum bit $S_i$. As seen in Table I, sum bit $S_i$ has the value 0 if a total even number of the summand and carry-in bits have the value 1 and has the value 1 if a total odd number of the summand and carry-in bits have the value 1.

More particularly, current mode summer 100 includes five current mode switches each associated with a different one of the input bits $x_i$, $y_i$, $z_i$, $C_i$ and $C_i'$. Each current mode switch comprises a pair of transistors 102 and 103. The base of each of transistors 102 is connected to an associated one of the input bit leads $x_i$, $y_i$, $z_i$, $C_i$ and $C_i'$. The bases of transistors 103 are connected in common to a reference potential $V_R$.

The emitters of each pair of transistors 102 and 103 are connected in common to an associated constant current source of magnitude I. The collectors of transistors 102 are connected in common to a positive supply $V_{cc}$ via resistor 109. The collectors of transistors 103 are also connected to $V_{cc}$. In particular, the collectors of the three transistors 103 associated with summand bits $x_i$, $y_i$ and $z_i$ are connected to $V_{cc}$ via resistor 111. The collectors of the two transistors 103 associated with carry-in bits $C_i$ and $C_i'$ are connected directly to $V_{cc}$.

As indicated in FIG. 5, adder stage $A_i$ is illustratively implemented in FIGS. 3 and 4 utilizing negative logic in which 0 is represented by a potential more positive than the potential $V_R$ and 1 is represented by a potential more negative than $V_R$. Thus when a selected one of input bits $x_i$, $y_i$, $z_i$, $C_i$ and $C_i'$ has the value 0, the associated transistor pair 102 and 103 are conductive and nonconductive, respectively. When an input bit is 1, the opposite conductivity obtains. Thus total input weight signal TW takes on one of six levels given by $V_{cc}$—$NIR_{109}$ where N is the number of the input bits applied to stage $A_i$ which have the value 1, and $R_{109}$ is the magnitude of resistor 109.

As previously noted, detector 125 responds to signal TW to generate sum bit $S_i$. Detector 125 includes five current mode switches respectively comprising transistor pairs 131 & 141, 132 & 142, 133 & 143, 134 & 144 and 135 & 145. The bases of transistors 131, 132 . . . 135 are respectively held at predetermined potentials V1, V2, . . . V5. Signal TW is provided to the bases of transistors 142 and 144 directly, and to the bases of transistors 141, 143 and 145 via level-shifting diodes 138.

When none of the input bits $x_i$, $y_i$, $z_i$, $C_i$ and $C_i'$ has the value 1, total input weight signal TW is more negative than each of the potentials V1, V2 . . . V5. Thus transistors 141, 142 . . . 145 are all nonconductive. Because transistors 141 and 143 are cut off the emitter current of transistors 132 and 134 is zero. No current flows through output resistor 136. The signal on lead $S_i$ is thus substantially equal to $V_{cc}$, the potential of which is greater than the potential $V_R$. Thus sum bit $S_i$ has the (negative logic) value 0.

When a single one of the input bits $x_i$, $y_i$, $z_i$, $C_i$ and $C_i'$ has the value 1, signal TW exceeds the potential V1 and the current mode switch comprised of transistors 131 and 141 changes state. Transistors 131 and 141 become nonconductive and conductive, respectively. Current is drawn through output resistor 136 via transistors 132 and 141. Lead $S_i$ drops to a potential substantially less than $V_{cc}$, and more particularly, to a potential less than $V_R$. Accordingly, sum bit $S_i$ has the value 1.

When two of the input bits $x_i$, $y_i$, $z_i$, $C_i$ and $C_i'$ have the value 1, signal TW exceeds the potential V2. Transistors 132 aand 142 become nonconductive and conductive, respectively. The above-traced path for current through output resistor 136 via transistors 132 and 141 is interrupted. The potential on lead $S_i$ returns to $V_{cc}$, indicating that sum bit $S_i$ has the value 0.

When three of the input bits $x_i$, $y_i$, $z_i$, $C_i$ and $C_i'$ have the value 1, signal TW exceeds the potential V3. Transistors 133 and 143 become nonconductive and conductive, respectively. Current is thus drawn through output resistor 136 via transistors 134 and 143. The potential on lead $S_i$ again drops below $V_R$, indicating that sum bit $S_i$ has the value 1.

When four of the input bits $x_i$, $y_i$, $z_i$, $C_i$ and $C_i'$ have the value 1, total input weight signal TW exceeds the potential V4. Transistors 134 and 144 become nonconductive and conductive, respectively. The abovetraced path for current through output resistor 136 via transistors 134 and 143 is interrupted. The potential on lead $S_i$ again becomes $V_{cc}$, indicating that sum bit $S_i$ has the value 0.

Finally, when all five of the input bits $x_i$, $y_i$, $z_i$, $C_i$ and $C_i'$ have the value 1, total input weight signal TW exceeds the potential V5. Transistors 135 and 145 become nonconductive and conductive, respectively. Current is drawn through output resistor 136 via transistor 145. The potential on lead $S_i$ drops below $V_R$ indicating that sum bit $S_i$ has the value 1.

As mentioned above, the three of transistors 103 associated with summand bits $x_i$, $y_i$ and $z_i$ are connected to $V_{cc}$ via resistor 111. There is thus provided on lead 114 a four-level signal SW indicating the total summand weight for adder stage $A_i$, that is the number of summand bits $x_i$, $y_i$ and $z_i$ which have the value 1. The voltage level of the signal SW is given by $V_{cc}$—($-4$—$\Sigma_i$)$IR_{111}$ where, as in Table I, $\Sigma_i$ is the total weight of the summand bits applied to stage $A_i$, and where $R_{111}$ is the magnitude of resistor 111.

Total summand weight signal SW is extended to carry-line propagation circuit 14 of FIG. 4. The latter, it will be remembered, is an illustrative implementation of the functional schematic diagram of circuit 14 in FIG. 2. Circuit 14 in FIG. 4 comprises switching matrix controller 150 and carry propagation switching matrix 175. Switching matrix 175 is operative for establishing carry-line paths between a selected one of carry-in leads $C_i$ and $C_i'$ of adder stage $A_i$ and a selected one of its carry-out leads $C_{i+1}$ and $C_{i+1}'$. Switching matrix controller 150 operates in response to total summand weight signal SW to control switching matrix 175 whereby appropriate carry-line paths are established in adder stage $A_i$ in accordance with the invention.

Switching matrix 175 comprises two dual-emitter carry-in transistors 180 and 190 and two dual-emitter carry-out transistors 181 and 191. The bases of transistors 180 and 190 are connected to carry-in leads $C_i$ and $C_i'$, respectively. The bases of transistors 181 and 191 are connected to carry-out leads $C_{i+1}$ and $C_{i+1}'$, respectively.

Emitter E1 of transistor 180 is connected to emitter E1 of transistor 181 via lead 186. This connection provides a controllable carry-line path between carry-in lead $C_i$ and carry-out lead $C_{i+1}$ which can be established, i.e. completed, or interrupted as explained in detail shortly. A connection between emitter E2 of transistor 180 and emitter E2 of transistor 191 via lead 187 provides a similar controllable carry-line path between carry-in lead $C_i$ and carry-out lead $C_{i+1}'$. A connection between emitter E1 of transistor 190 and emitter E1 of transistor 191 via lead 196, and a connection between emitter E2 of transistor 190 and emitter E2 of transistor 181 via lead 197 respectively provide similar controllable carry-line paths between carry-in lead $C_i'$ and carry-out leads $C_{i+1}$ and $C_{i+1}'$.

Switching matrix 175 further comprises control transistors CT0, CT1, CT2 and CT3, each of which controls a different associated one of the four above-mentioned carry-line paths. The collectors of control transistors CT0 . . . CT3 are connected to $V_{cc}$. The emitters thereof are respectively connected to leads 197, 186, 196 and 187. The bases thereof are respectively connected to control leads CL0, CL1, CL2 and CL3.

If a signal at logic level 1 is provided on any of control leads CL0 . . . CL3, the corresponding control transistor is forward-biased and the carry-line path associated with that transistor is interrupted. If, however, a signal at logic level 0 is provided on a selected one of the control leads, the corresponding transistor is nonconductive and the carry-line path associated with that control transistor is established, or completed, as will now be explained.

Assume by way of example that a carry-line path is to be established between carry-in lead $C_i$ and carry-out lead $C_{i+1}$. In that case, controller 150 provides signals at logic level 0 on control leads CL0, CL2, CL3, and a signal at logic level 1 on control lead CL1. Control transistors CT0, CT2 and CT3 are all conductive, and thus leads 197, 196 and 187 are all substantially at $V_{cc}$. The signals on carry-in leads $C_i$ and $C_i'$ are always less than $V_{cc}$. Thus the collector-emitter E2 junction of transistor 180 is reverse-biased as are both collector-emitter junctions of transistor 190. Thus the carry-line path between carry-in lead $C_i$ and carry-out lead $C_{i+1}'$ as well as the carry-line paths between carry-in lead $C_i'$ and carry-out leads $C_{i+1}$ and $C_{i+1}'$ are all interrupted.

However, control transistor CT1 is nonconductive. The collector-emitter junction E1 of transistors 180 and 181 are both forward-biased and these two transistors are in their active regions. The collector current of transistor 180 flows exclusively into its emitter E1 to a constant current source 184 of magnitude I. Similarly, the collector current of diode connected transistor 181, which is constrained by constant current source 182 to have a magnitude substantially equal to I/2, flows exclusively through its emitter E1 to current source 184. Thus the collector current of transistor 180 is also constrained to be substantially I/2. Accordingly, transistors 180 and 181 are at substantially identical bias points and carry-in lead $C_i$ and carry-out lead $C_{i+1}$ are at substantially identical potentials.

If the potential on carry-in lead $C_i$ now drops, indicating a carry-in bit $C_i$ value of 1, emitter-follower action in transistor 180 correspondingly drops the potential of emitter E1 of transistor 180. Diode action in transistor 181 couples this change in potential to the carry-out lead $C_{i+1}$, indicating a carry-out bit $C_{i+1}$ value of 1. Since transistors 180 and 181 operate in their active regions, the propagation of carry signals between them in the manner just described is, advantageously, substantially as fast as propagation along a simple wire.

The operation of switching matrix 175 in establishing each of the other three carry-line paths is similar to that for the path between carry-in lead $C_i$ and carry-out lead $C_{i+1}$ and is obvious from the above discussion thereof. Thus no further detailed description of switching matrix 175 is necessary. Of course, it will be appreciated that the circuitry shown in FIG. 4 for switching matrix 175, (as well as all the specific circuitry shown and described herein) is merely illustrative and that many different arrangements providing the same functions may be devised by those skilled in the art. For example, switching matrix 175 may alternatively comprise linear transmission gates such as those which can be advantageously fabricated via CMOS technology.

Switching matrix controller 150 includes three current mode switches respectively comprising transistor pairs 151 & 152, 156 & 157 and 161 & 162. The collectors of transistors 161 and 162 are connected to the emitters of transistor pairs 151 & 152 and 156 & 157, respectively. The bases of transistors 151, 161 and 156 are connected to predetermined potentials V1, V2 and V3. If resistors 109 and 111 in summer 100 have substantially equal magnitudes, potentials V1, V2 and V3 in controller 150 may be identical to potentials V1, V2 and V3 provided in detector 125. Total summand weight signal SW is extended to the bases of transistors 152 and 157 via diode 167, and to the base of transistor 162 via diodes 167 and 166.

The collectors of transistors 151, 152, 156 and 157 are individually connected to $V_{cc}$ via resistors 169. In addition, these collectors are connected to control leads CL3, CL2, CL1 and CL0, respectively. Thus when a particular one of transistors 151, 152, 156 and 157 is conductive, a negative logic 1 is extended along cable CA to the base of one of control transistors CT3, CT2, CT1 and CT0. The collectors of transistors 151 and 152 are further connected to control lead CL4 via OR gate diodes 153 and 154, respectively so that when either of these transistors is conductive, a negative logic 1 is also provided on control lead CL4.

The overall operation of carry-line propagation circuit 14 in FIG. 4 will now be explained. Reference may be made, if desired, to the functional schematic diagram of circuit 14 in FIG. 2.

When each of the three summand bits $x_i$, $y_i$ and $z_i$ applied to summer 100 has the value 0, i.e. $\Sigma_i=0$ in Table I, total summand weight signal SW is substantially at the potential of $V_{cc}$. That potential is more positive than any of the potentials V1, V2 and V3. Thus transistors 162 and 157 are conductive. A 1 is provided on control lead CL0. Control transistor CT0 becomes nonconductive, establishing a carry-line path between carry-in lead $C_i'$ and carry-out lead $C_{i+1}$.

When a single one of summand bits $x_i$, $y_i$ and $z_i$ has the value 1, i.e. $\Sigma_i= 1$, total summand weight signal SW drops to a potential between potentials V2 and V3. Transistors 156 and 157 become conductive and nonconductive, respectively, and a 1 is provided on control lead CL1. Control transistor CT1 becomes nonconductive, establishing a carry-line path between carry-in lead $C_i$ and carry-out lead $C_{i+1}$.

When two of the summand bits $x_i$, $y_i$ and $z_i$ have the value 1, i.e. $\Sigma_i = 2$, total summand weight signal SW drops to a potential between potentials V1 and V2. Transistors 161 and 152 become conductive. A 1 is provided on control lead CL2. Control transistor CT2 becomes nonconductive, establishing a carry-line path between carry-in lead $C_i'$ and carry-out lead $C_{i+1}'$. At the same time, a 1 is provided on control lead CL4 via diode 154, immediately generating a carry-out bit $C_{i+1}$ of value 1.

Finally, when all three summand bits $x_i$, $y_i$ and $z_i$ have the value 1, to i.e. $\Sigma_i = 3$, total summand weight signal SW drops to a potential below the potential V1. Transistors 151 and 152 become conductive and nonconductive, respectively. A 1 is provided on control lead CL3. Control transistor CT3 becomes nonconductive, establishing a carry-line path between carry-in lead $C_i$ and carry-out lead $C_{i+1}'$. At the same time a 1 is provided on control lead CL4 via diode 153, immediately generating a carry-out bit $C_{i+1}$ of value 1.

The three-word adder shown in FIGS. 1–4 comprises one-bit adder stages, i.e. stages which respectively receive a single bit from each of the three summand words. In accordance with the invention, carry-line propagation can be implemented advantageously in a three-word adder comprising two-bit adder stages, as well. As in the one-bit adder stage, carry-line propagation is implemented in a two-bit adder stage by utilizing the present equal-carry-weight assignment scheme.

Figure 6:
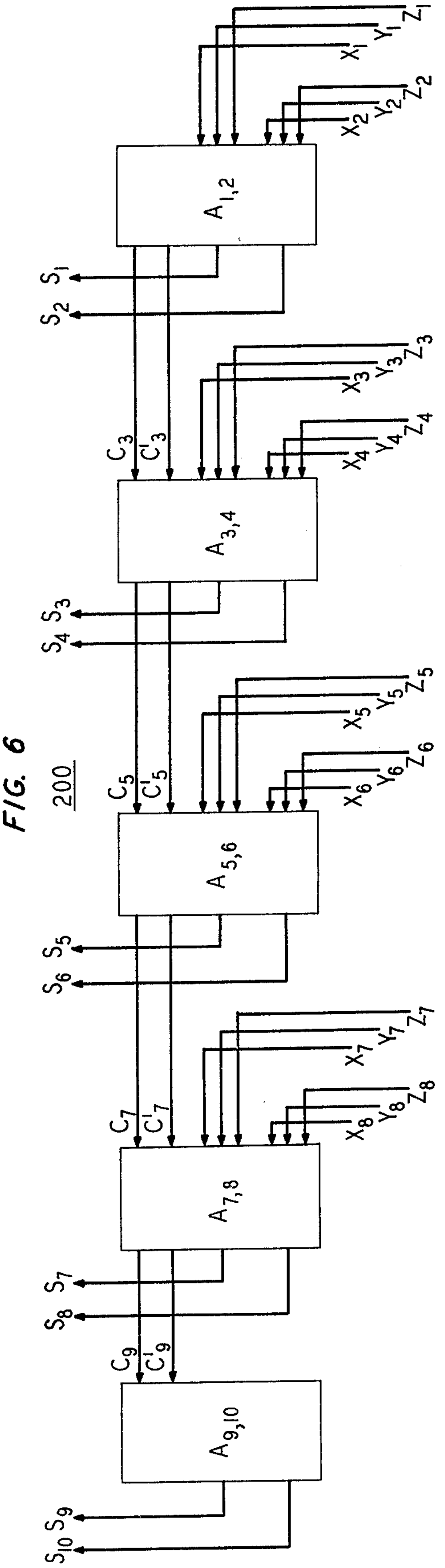
FIG. 6 is a block diagram of a further illustrative three-word adder using two-bit adder stages to implement the carry-weight assignment scheme of the present invention.

Thus in FIG. 6, three-word adder 200 is seen to comprise four two-bit adder stages $A_{1,2}$, $A_{3,4}$, $A_{5,6}$ and $A_{7,8}$, as well as spillover stage $A_{9,10}$. The bits of the three words added by adder 200 are bits $x_1 \ldots x_8$, $y_1 \ldots y_8$ and $z_1 \ldots z_8$, respectively. Each adder stage receives two adjacent bits from each summand word. Thus, for example, bits $x_5$, $y_5$ and $z_5$ and bits $x_6$, $y_6$ and $z_6$ are all applied to adder stage $A_{5,6}$ as its summand bits. Each adder stage provides two sum bits and two carry-out bits. In accordance with the invention, the carry-out bits from each stage have equal weight — that weight being twice that of the more significant sum bit generated by the stage. Both carry-out bits provided by each stage are applied to the next higher order stage as the carry-in bits of the latter. The stages of adder 200 may be substantially identical to each other.

Table II shows the values of sum bits $S_5$ and $S_6$ and carry-out bits $C_7$ and $C_7'$ which adder stage $A_{5,6}$, for example, generates in response to various combinations of the summand and carry-in bits applied thereto. In a binary word, the weight of each bit is twice that of the less significant adjacent bit. Thus in adder stage $A_{5,6}$ the total summand input weight, $\Sigma_{5,6}$, is determined by doubling the number of summand bits $x_6$, $y_6$ and $z_6$ which have the value 1, and adding it to the number of summand bits $x_5$, $y_5$ and $z_5$ which have the value 1. Thus $\Sigma_{5,6}$ can take on any value from 0 to 9.

TABLE II

| $\Sigma_{5,6}$ | Inputs $C_5$ | $C_5'$ | Total Input Weight | $S_5$ | Outputs $S_6$ | $C_7$ | $C_7'$ | Carry Line Rules |
|---|---|---|---|---|---|---|---|---|
| 0 | 0 | 0 | 0 | 0 | 0 | 0 | 0 | |
| 0 | 1 | 0 | 1 | 1 | 0 | 0 | 0 | |
| | | | | | | | | $C_7$="0" |
| 0 | 1 | 1 | 2 | 0 | 1 | 0 | 0 | |
| | | | | | | | | $C_7'$="0" |
| 1 | 0 | 0 | 1 | 1 | 0 | 0 | 0 | |
| 1 | 1 | 0 | 2 | 0 | 1 | 0 | 0 | |
| 1 | 1 | 1 | 3 | 1 | 1 | 0 | 0 | |
| 2 | 0 | 0 | 2 | 0 | 1 | 0 | 0 | |
| | | | | | | | | $C_7$=$C_5'$ |
| 2 | 1 | 0 | 3 | 1 | 1 | 0 | 0 | |
| | | | | | | | | $C_7'$="0" |
| 2 | 1 | 1 | 4 | 0 | 0 | 1 | 0 | |
| 3 | 0 | 0 | 3 | 1 | 1 | 0 | 0 | |
| | | | | | | | | $C_7$=$C_5$ |
| 3 | 1 | 0 | 4 | 0 | 0 | 1 | 0 | |
| | | | | | | | | $C_7'$="0" |
| 3 | 1 | 1 | 5 | 1 | 0 | 1 | 0 | |
| 4 | 0 | 0 | 4 | 0 | 0 | 1 | 0 | |
| 4 | 1 | 0 | 5 | 1 | 0 | 1 | 0 | |
| | | | | | | | | $C_7$="1" |
| 4 | 1 | 1 | 6 | 0 | 1 | 1 | 0 | |

TABLE II-Continued

| $\Sigma_{5,6}$ | Inputs $C_5$ | $C_5'$ | Total Input Weight | $S_5$ | Outputs $S_6$ | $C_7$ | $C_7'$ | Carry Line Rules |
|---|---|---|---|---|---|---|---|---|
| 5 | 0 | 0 | 5 | 1 | 0 | 1 | 0 | $C_7'$="0" |
| 5 | 1 | 0 | 6 | 0 | 1 | 1 | 0 | |
| 5 | 1 | 1 | 7 | 1 | 1 | 1 | 0 | |
| 6 | 0 | 0 | 6 | 0 | 1 | 1 | 0 | |
| | | | | | | | | $C_7$="1" |
| 6 | 1 | 0 | 7 | 1 | 1 | 1 | 0 | |
| 6 | 1 | 1 | 8 | 0 | 0 | 1 | 1 | $C_7'$=$C_5'$ |
| 7 | 0 | 0 | 7 | 1 | 1 | 1 | 0 | |
| | | | | | | | | $C_7$="1" |
| 7 | 1 | 0 | 8 | 0 | 0 | 1 | 1 | |
| 7 | 1 | 1 | 9 | 1 | 0 | 1 | 1 | $C_7'$=$C_5$ |
| 8 | 0 | 0 | 8 | 0 | 0 | 1 | 1 | |
| 8 | 1 | 0 | 9 | 1 | 0 | 1 | 1 | |
| | | | | | | | | $C_7$="1" |
| 8 | 1 | 1 | 10 | 0 | 1 | 1 | 1 | |
| 9 | 0 | 0 | 9 | 1 | 0 | 1 | 1 | |
| | | | | | | | | $C_7'$="1" |
| 9 | 1 | 0 | 10 | 0 | 1 | 1 | 1 | |
| 9 | 1 | 1 | 11 | 1 | 1 | 1 | 1 | |

As indicated in the "Carry Line Rules" column of Table II, I have discovered that for each possible total summand weight, i.e. for each value of $\Sigma_{5,6}$, the value of each of the carry-out bits $C_7$ and $C_7'$ from adder stage $A_{5,6}$ is either independent of the values of carry-in bits $C_5$ and $C_5'$ or is the same as the value of a selected one of them. Thus, advantageously, carry-line propagation can be implemented in adder 200.

Figure 7:
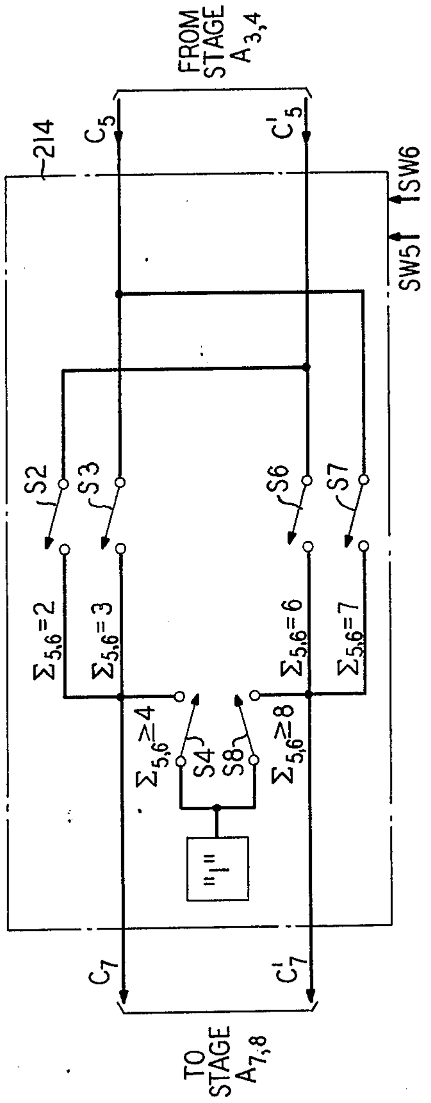
FIG. 7 is a functional schematic diagram of a carry-line propagation circuit in accordance with the invention for use in the stages of the adder of FIG. 6.

In this regard, attention is directed to FIG. 7 which is a functional schematic diagram of an illustrative carry-line propagation circuit 214 for adder stage $A_{5,6}$. Circuit 214 receives first and second carry-in bits on leads $C_5$ and $C_5'$ and provides first and second carry-out bits on leads $C_7$ and $C_7'$.

Carry-line propagation circuit 214 is similar to circuit 14 in FIG. 2 and need not be discussed in detail herein. Briefly, circuit 214 includes switches S2, S3, S6 and S7. These switches are controlled by signals on leads SW5 and SW6 which, in combination, indicate the magnitude of $\Sigma_{5,6}$ as described fully hereinbelow. In particular, when $\Sigma_{5,6} = 2$, 3, 6 and 7, switches S2, S3, S6 and S7, respectively, are closed, and carry-line paths between carry-in/carry-out lead pairs $C_5'/C_7$, $C_5/C_7$, $C_5'/C_7'$ and $C_5/C_7'$, respectively, are established. Circuit 214 further includes switches S4 and S8. The former provides carry-out bit $C_7$ with the value 1 when $\Sigma_{5,6} \geq 4$. The latter provides carry-out bit $C_7'$ with the value 1 when $\Sigma_{5,6} \geq 8$. The appropriateness of the arrangement for carry-line propagation circuit 214 just described can be verified by inspection of Table II.

Figure 8:
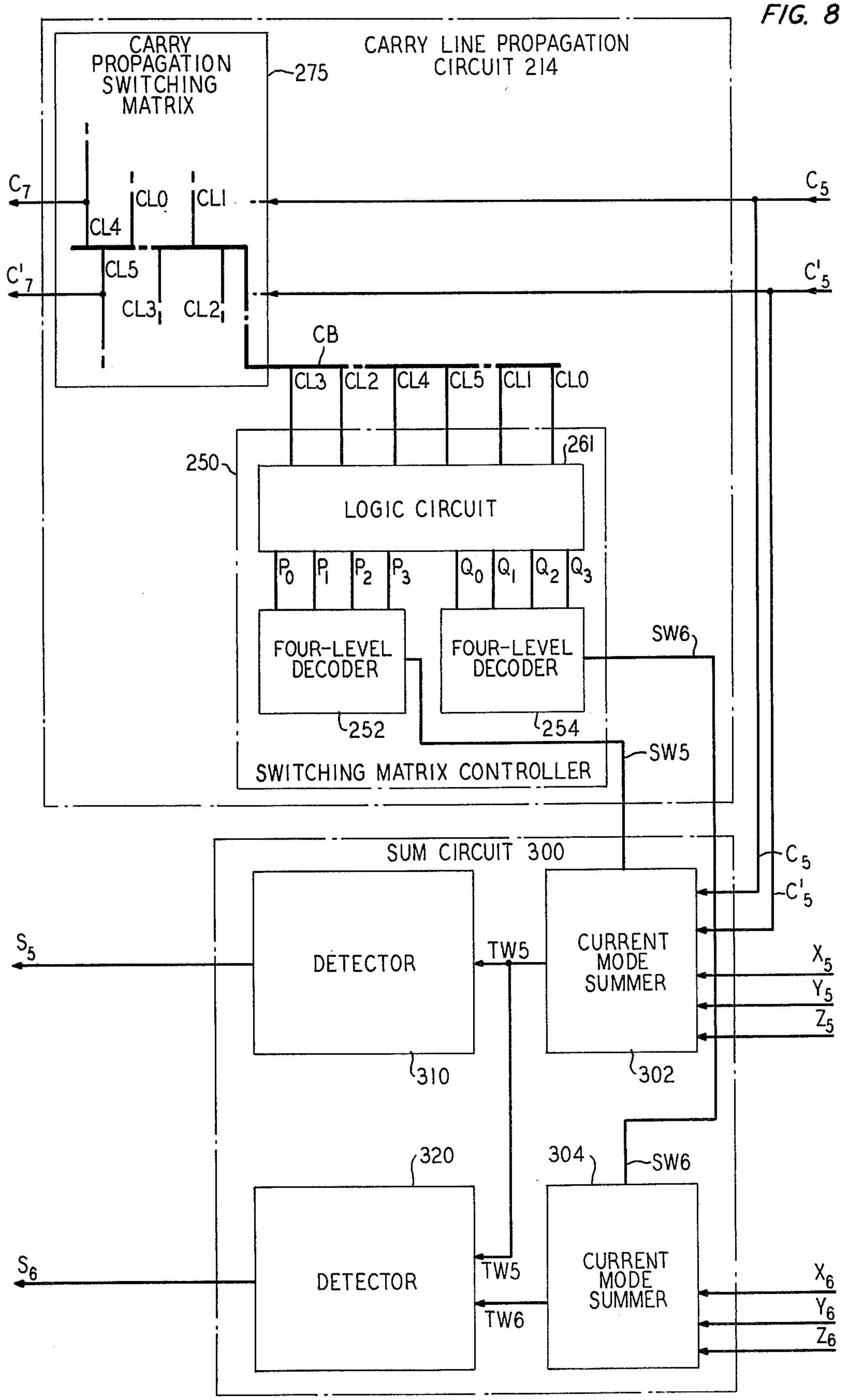
FIG. 8 is a block diagram of an illustrative full adder stage for the adder of FIG. 6.

FIG. 8 shows a complete illustrative embodiment for adder stage $A_{5,6}$. The embodiment of FIG. 8 includes sum circuit 300 and carry-line propagation circuit 214. The latter is an illustrative block diagram implementation of the functional schematic diagram of circuit 214 in FIG. 7.

Sum circuit 300 includes a first current mode summer 302 which receives summand bits $x_5$, $y_5$, $z_5$ and carry-in bits $C_5$ and $C_5'$. Summer 302 generates a five-level input weight signal TW5, which indicates the number of these five input bits which have the value 1. Signal TW5 is extended to detector 310, which generates sum bit $S_5$. The value of sum bit $S_5$ is 1 when a total odd number of bits $x_5$, $y_5$, $z_5$, $C_5$ and $C_5'$ have the value 1. Otherwise the value of sum bit $S_5$ is 0. Thus, it will be appreciated that current mode summer 302 and detector 310 may be substantially identical, for example, to summer 100 and detector 125, respectively, in FIG. 3.

Sum circuit 300 further includes a second current mode summer 304, which receives the three summand bits $x_6$, $y_6$ and $z_6$. Summer 304 generates a three-level input weight signal TW6 indicative of the number of these three input bits which have the value 1. Summer 304 may comprise, for example, a modified version of summer 100 in FIG. 3, with the upper two pairs of transistors 102 and 103 deleted.

Figure 9:
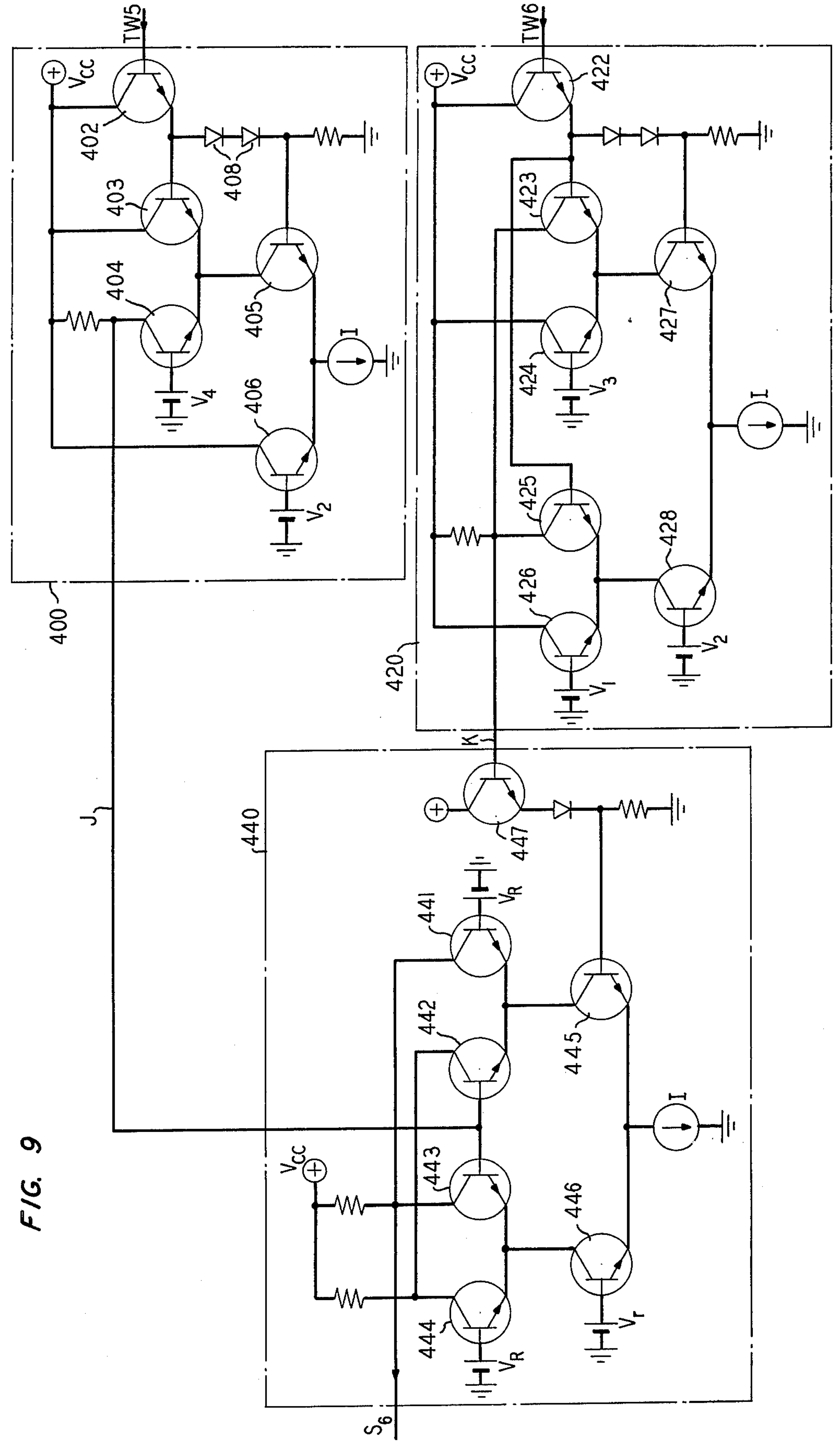
FIG. 9 is a circuit diagram of an illustrative current level detector for use in the adder stage of FIG. 8.

Input weight signals TW5 and TW6 are both extended in sum circuit 300 to detector 320. The latter generates sum bit $S_6$ in response thereto. An illustrative embodiment of detector 320 is shown in FIG. 9 and is described in detail hereinafter.

In addition to input weight signal TW5, summer 302 also generates summand weight signal SW5. The latter indicates the number of the summand bits $x_5$, $y_5$ and $z_5$ which have the value 1. Summand weight signal SW5 is extended by summer 302 to switching matrix controller 250 in carry-line propagation circuit 214. Summer 304 generates summand weight signal SW6. The latter indicates the number of the summand bits $x_6$, $y_6$ and $z_6$ which have the value 1. (Since no carry-in bits are applied to summer 304, signal SW6 is in actuality the same signal as signal TW6.) Summand weight signal SW6 is also extended to switching matrix controller 250. Controller 250 includes four-level decoders 252 and 254 which respectively receive signals SW5 and SW6.

Decoders 252 and 254 may each be substantially identical to controller 150 in FIG. 4. Thus, decoder 252 provides a signal on only one of its four output leads $P_0$, $P_1$, $P_2$ and $P_3$ and thereby indicates the present level of signal SW5 and thus the number of summand bits $x_5$, $y_5$ and $z_5$ which have the value 1. Similarly, decoder 254 provides a signal on a single one of its four output leads $Q_0$, $Q_1$, $Q_2$ and $Q_3$. Decoder 254 thereby indicates the present level of signal SW6 and thus the number of summand bits $x_6$, $y_6$ and $z_6$ which have the value 1.

Leads $P_0 \ldots P_3$ and $Q_0 \ldots Q_3$ are extended to logic circuit 261 in controller 250. There are sixteen possible combinations of signals on leads $P_0 \ldots P_3$ and $Q_0 \ldots Q_3$ since at any given time, a signal is provided on one of leads $P_0 \ldots P_3$ and on one of leads $Q_0 \ldots Q_3$. Each of these sixteen combinations represents a particular value of $\Sigma_{5,6}$ in Table II, i.e. the total weight of the summand bits applied to adder stage $A_{5,6}$. If the value of $\Sigma_{5,6}$ represented by the signals on leads $P_0 \ldots P_3$ and $Q_0 \ldots Q_3$ indicates that a carry-line path is to be established or that a 1 is to be immediately provided on one or both carry-out leads $C_7$ and $C_7'$, a logic circuit 261 provides an appropriate control signal to carry propagation switching matrix 275 via cable CB.

For example, signals on leads $P_2$ and $Q_2$ indicate that two of the summand bits $x_5$, $y_5$ and $z_5$ have the value 1 and two of the summand bits $x_6$, $y_6$ and $z_6$ have the value 1. Summand bits $x_6$, $y_6$ and $z_6$ have twice the weight of summand bits $x_5$, $y_5$ and $z_5$. Thus $\Sigma_{5,6} = 6$. Table II indicates that for $\Sigma_{5,6}=6$, $C_7=1$ and $C_7'=C_5'$.

Thus AND circuitry, for example, in logic circuit 261 responsive to concurrent signals on leads $P_2$ and $Q_2$ provides signals to switching matrix 275 on control leads CL2 and CL4. Switching matrix 275 may be substantially identical to switching matrix 175 in FIG. 4. Accordingly, the signal on control lead CL2 establishes, as required, a path between carry-in lead $C_5'$ and carry-out lead $C_7'$. At the same time, the signal on control lead CL4 is applied directly to carry-out lead $C_7$ to indicate that carry-out bit $C_7$ has the value 1.

Logic circuit 261 operates similarly for each possible combination of signals on leads $P_0 \ldots P_3$ and $Q_0 \ldots Q_3$. In particular it may be noted that if $\Sigma_{5,6} \geq 8$, circuit 261 provides control signals on leads CL4 and CL5 so that, as indicated in Table II, both carry-out bits $C_7$ and $C_7'$ have the value 1.

As mentioned above, detector 320 in sum circuit 300 generates sum bit $S_6$ in response to input weight signals TW5 and TW6. It can be verified from Table II that sum bit $S_6$ is given by the exclusive-OR function of two logic variables, J and K, where variable J has the value 1 if and only if two or three of input bits $x_5$, $y_5$, $z_5$, $C_5$ and $C_5'$ have the value 1, and variable K has the value 1 if and only if one or three of input bits $x_6$, $y_6$ and $z_6$ have the value 1. The illustrative embodiment of detector 320 shown in FIG. 9 includes circuit 400, which generates logic variable J on lead J, circuit 420 which generates logic variable K on lead K, and circuit 440, which generates the exclusive-OR function of logic variables J and K.

In particular, input weight signal TW5 is provided to circuit 400 at the base of emitter-follower input transistor 402. If the magnitude of signal TW5 indicates that none or one of input bits $x_5$, $y_5$, $z_5$, $C_5$ and $C_5'$ has the value 1, transistors 405 and 406 are nonconductive and conductive, respectively. Thus transistors 403 and 404 are both nonconductive. The collector of transistor 404 is substantially at $V_{cc}$ and therefore, the signal provided on lead J is a (negative logic) 0.

If two or three of input bits $x_5$, $y_5$, $z_5$ and $z_5'$ have the value 1, the signal provided at the base of transistor 405 via transistor 402 and diodes 408 exceeds the potential V2 provided at the base of transistor 406. Thus transistors 405 and 406 are conductive and nonconductive, respectively. The signal at the base of transistor 403 is less than the potential V4 provided at the base of transistor 404. Thus transistor 403 and 404 are nonconductive and conductive, respectively. The potential at the collector of transistor 404 drops below the potential $V_R$, indicating that logic variable J has the value 1.

Finally, if four or five of input bits $x_5$, $y_5$, $z_5$, $C_5$ and $C_5'$ have the value 1, transistors 403 and 404 become conductive and nonconductive, respectively. The potential at the collector of transistor 404 is substantially $V_{cc}$ and therefore, logic variable J has the value 0.

At the same time, input weight signal TW6 is provided at the base of emitter-follower input transistor 422 in circuit 420. If the value of signal TW6 indicates that none of input bits $x_6$, $y_6$ and $z_6$ has the value 1, transistors 427 and 428 are nonconductive and conductive, respectively. Thus transistors 423 and 424 are both nonconductive. Transistors 425 and 426 are nonconductive and conductive, respectively. Thus the potential provided on lead K from the collector of transistor 425 is substantially at $V_{cc}$, indicating that logic variable K has the value 0.

If only one of summand bits $x_6$, $y_6$ and $z_6$ has the value 1, transistors 425 and 426 are conductive and nonconductive, respectively. The signal on lead K drops below a predetermined potential $V_r$ indicating that logic variable K has the value 1.

If two of summand bits $x_6$, $y_6$ and $z_6$ have the value 1, transistors 427 and 428 are conductive and nonconductive, respectively. Transistors 425 and 426 are nonconductive. Transistor 424 is conductive while transistor 423 is nonconductive. Thus the potential on lead K is again substantially at $V_{cc}$, indicating that logic variable K has the value 0.

Finally, if all three of summand bits $x_6$, $y_6$ and $z_6$ have the value 1, transistors 423 and 424 are conductive and nonconductive, respectively. Lead K again drops below the potential $V_r$ indicating that logic variable K has the value 1.

The signal on lead K is extended in exclusive-OR circuit 440 to the base of transistor 445 via emitter-follower input transistor 447. When logic variable K has the value 0, transistors 445 and 446 are conductive and nonconductive, respectively. Transistors 443 and 444 are thus both nonconductive. If, in addition, logic variable J has the value 0, transistors 441 and 442 are nonconductive and conductive, respectively. Thus lead $S_6$ is substantially at $V_{cc}$ indicating that sum bit $S_6$ has the value 0. If, on the other hand, logic variable J has the value 1, transistors 441 and 442 are conductive and nonconductive, respectively. The potential on lead $S_6$ drops, indicating that sum bit $S_6$ has the value 1.

When logic variable K has the value 1, transistors 445 and 446 are nonconductive and conductive, respectively. Thus transistors 441 and 442 are nonconductive. If, in addition, logic variable J has the value 0, transistors 443 and 444 are conductive and nonconductive, respectively. Thus the potential at the collector of transistor 443 indicates that sum bit $S_6$ has the value 1. Finally, if logic variable J has the valuc 1, transistors 443 and 444 are nonconductive and conductive, respectively. The potential on lead $S_6$ is again substantially at $V_{cc}$, indicating that sum bit $S_6$ has the value 0.

It is to be understood that the preceding detailed description and illustrative embodiments are merely illustrative of the principles of my invention. Many and other varied arrangements in accordance with those principles may be devised by those skilled in the art without departing from the spirit and scope thereof.

What is claimed is:

1. An adder stage comprising means for receiving a first group of at least three summand bits, means for receiving a plurality of carry-in bits, carry output means, and means responsive to said summand bits and said carry-in bits for providing an plurality of carry-out bits to said carry output means, said carry-out bit providing means characterized by means for routing at least a selected one of said carry-in bits to said carry output means in accordance with a scheme allocating equal weights to said carry-out bits and in response to predetermined combinations of values of said summand bits.

2. The adder stage of claim 1 further comprising means operative in response to predetermined combinations of said summand bit values for generating at least a first one of said carry-out bits independently of said carry-in bits.

3. The adder stage of claim 2 wherein said carry-in bit receiving means includes first and second carry-in terminals and said carry output means includes first and second carry-out terminals, and wherein said routing means includes means for determining the total weight of said summand bits and means operative in response to each of a plurality of values of said total weight for establishing an associated carry-line path between a predetermined one of said carry-in terminals and a predetermined one of said carry-out terminals.

4. The adder stage of claim 3 wherein said carry-line path establishing means includes means operative when said total summand bit weight has first, second, third and fourth values for establishing a carry-line path between said second carry-in and first carry-out terminals, between said first carry-in and first carry-out terminals, between said second carry-in and second carry-out terminals and between said first carry-in and second carry-out terminals, respectively, said first, second, third and fourth values being of increasing magnitude in the order named.

5. The adder stage of claim 4 wherein said carry-out bit generating means includes means operative when said total summand bit weight has said second and said third values for providing said first one of said carry-out bits at said first carry-out terminal.

6. The adder stage of claim 4 further comprising means for receiving a second group of at least three summand bits, the bits of said second group having twice the weight of the bits of said first group.

7. The adder stage of claim 6 wherein said carry-out bit generating means includes means operative when the value of said total summand weight is greater than said second value for providing said first one of said carry-out bits at said first carry-out terminal and means operative when the value of said total summand weight is greater than said fourth value for providing a second one of said carry-out bits at said second carry-out terminal.

8. An adder stage comprising means for receiving three summand bit signals, first and second carry input means for receiving first and second carry-in bit signals, each of said summand bit signals and each of said carry-in bit signals being at one of two predetermined values, means for generating first and second carry-out bit signals, and first and second carry output means for receiving said first and second carry-out bit signals, respectively, said generating means characterized by means operative when none, one, two and three of said summand bit signals are at a selected one of said two predetermined values for establishing a conducting path between said second carry input means and said first carry output means, between said first carry input means and said first carry output means, between said second carry input means and said second carry output means, and between said first carry input means and said second carry output means, respectively.

9. The adder stage of claim 8 further comprising means for applying a signal at said selected one of said values to said first carry output means when at least two of said summand bit signals are at said selected one of said values.

10. The adder stage of claim 9 further comprising means for generating a sum bit signal at said selected one of said values when a total odd number of said summand and carry-in bit signals are at said selected one of said values.

11. An adder stage comprising means for receiving a first group of three summand bit signals each having single weight, a second group of three summand bit signals each having double weight, first and second carry input means for receiving first and second carry-in bit signals, each of said summand bit signals and each of said carry-in bit signals being at either a first or a second predetermined value, means for generating first and second carry-out bit signals, and first and second carry output means for receiving said first and second carry-out bit signals, respectively, said generating means characterized by means operative when ones of said summand bits at said first predetermined value have a total weight of two, three, six and seven for establishing a conducting path between said second carry input means and said first carry output means, between said first carry input means and said first carry output means, between said second carry input means and said second carry output means, and between said first carry input means and said second carry output means, respectively.

12. The adder stage of claim 11 further comprising means for applying a signal at said first predetermined value to said first carry output means when said total weight is at least four and means for applying a signal at said first predetermined value to said second carry output means when said total weight is at least eight.

13. The adder stage of claim 12 further comprising means for generating a first sum bit signal at said first predetermined value when a total odd number of said first group summand bit signals and said carry-out bit signals are at said first predetermined value and means for generating a second sum bit signal at said first predetermined value in accordance with the exclusive-OR function of first and second predetermined logic functions, said first logic function having a predetermined logic level if and only if two or three of said first group summand bit signals and said carry-in bit signals are at said first predetermined value and said second logic function having said predetermined logic level if and only if one or three of said second group summand bit signals are at said first predetermined value.

14. A three-word adder comprising; an ordered plurality of interconnected adder stages, each including means for receiving a first group of summand bits, first and second carry input means for receiving first and second carry-in bits, means for generating a first sum bit in response to said summand bits and said carry-in bits, first and second carry output means for providing first and second carry-out bits, and means responsive to said summand bits for routing at least a selected one of said carry-in bits to a selected one of said carry output means to generate at least one of said carry-out bits; and means for interconnecting said first and second carry output means of each of said stages to said first and second carry input means, respectively, of the next higher order stage in said adder.

15. The three-word adder of claim 14 wherein each of said summand bits has either a 0 or 1 value and wherein said routing means includes means operative when one and three of said summand bits have the value 1 for routing said first carry-in bit to said first and second carry output means, respectively, and means operative when none and two of said summand bits have the value 1 for routing said second carry-in bit to said first and second carry output means, respectively.

16. The three-word adder of claim 15 further including means operative when at least two of said summand bits have the value 1 for providing said first carry-out bit with the value 1.

17. A three-word adder comprising, an ordered plurality of interconnected adder stages each including means for receiving a first group of summand bits which each have a first weight, means for receiving a second group of three summand bits which each have a second weight, said second weight being twice said first weight, each of said first group and second group summand bits having either a 0 or 1 value, first and second carry input means for receiving first and second carry-in bits, means for generating first and second sum bits in response to said first and second summand bit groups and said carry-in bits, first and second carry output means for providing first and second carry-out bits, means operative when the total weight of said summand bits having the value 1 is three and seven for routing said first carry-in bit to said first and second carry output means, respectively, and means operative when said total weight is two and six for routing said second carry-in bit to said first and second carry output means, respectively, and means for connecting said first and second carry output means of each of said stages to said first and second carry input means, respectively, of the next higher order stage in said adder.

18. The three-word adder of claim 17 wherein each of said stages further includes means operative when said total weight is at least four for providing said first carry-out bit with the value 1 and means operative when said total weight is at least eight for providing said second carry-out bit with the value 1.

19. In a three-word adder stage adapted for receiving a plurality of summand bits and two carry-in bits, a method for providing a sum bit and for providing first and second carry-out bits at respective associated first and second carry output terminals, said method comprising the steps of generating said sum bit in response to said summand and said carry-in bits, determining the total weight of said summand bits, generating a selected one of said carry-out bits on the basis of said total weight and providing said selected carry-out bit at the associated one of said carry-out terminals, said selected carry-out bit having a weight twice that of said sum bit, and selecting one of said carry-in bits on the basis of said total weight and routing said selected carry-in bit to the other of said carry output terminals to provide the other of said carry-out bits, said other carry-out bit having a weight twice that of said sum bit.

20. The method of claim 19 wherein said selecting and routing step includes the steps of routing said first carry-in bit to said first and second carry output terminals when said total weight has second and fourth values, respectively, and routing said second carry-in bit to said first and second carry output terminals when said total weight has first and third values, respectively, said first, second, third and fourth values being of increasing magnitude in the order named.

21. The method of claim 20 wherein said carry-out bit generating and providing step includes the steps of generating said second carry-out bit when total weight has said first and second values and generating said first carry-out bit when said total weight has said third and fourth values.

22. The method of claim 20 wherein said carry-out bit generating and providing step includes the steps of providing said first carry-out bit with a first predetermined value when the magnitude of said total weight is greater than said second value and providing said second carry-out bit with a second predetermined value when the magnitude of said total weight is less than said third value and with said first predetermined value when said total weight is greater than said fourth value.

* * * * *

UNITED STATES PATENT AND TRADEMARK OFFICE

CERTIFICATE OF CORRECTION

PATENT NO. : 3,906,211

DATED : September 16, 1975

INVENTOR(S) : Arthur B. Glaser

It is certified that error appears in the above-identified patent and that said Letters Patent are hereby corrected as shown below:

Column 5, lines 32-51 should read --

TABLE I

| Inputs $\Sigma_i$ | $C_i$ | $C_i$ | Total Input Weight | Outputs $S_i$ | $C_{i+1}$ | $C'_{i+1}$ | Carry Line Rules |
|---|---|---|---|---|---|---|---|
| 0 | 0 | 0 | 0 | 0 | 0 | 0 | $C_{i+1} = C'_i$ |
| 0 | 1 | 0 | 1 | 1 | 0 | 0 | $C'_{i+1} = "0"$ |
| 0 | 1 | 1 | 2 | 0 | 1 | 0 | |
| 1 | 0 | 0 | 1 | 1 | 0 | 0 | $C_{i+1} = C_i$ |
| 1 | 1 | 0 | 2 | 0 | 1 | 0 | $C'_{i+1} = "0"$ |
| 1 | 1 | 1 | 3 | 1 | 1 | 0 | |
| 2 | 0 | 0 | 2 | 0 | 1 | 0 | $C_{i+1} = "1"$ |
| 2 | 1 | 0 | 3 | 1 | 1 | 0 | $C'_{i+1} = C'_i$ |
| 2 | 1 | 1 | 4 | 0 | 1 | 1 | |
| 3 | 0 | 0 | 3 | 1 | 1 | 0 | $C_{i+1} = "1"$ |
| 3 | 1 | 0 | 4 | 0 | 1 | 1 | $C'_{i+1} = C_i$ .-- |
| 3 | 1 | 1 | 5 | 1 | 1 | 1 | |

UNITED STATES PATENT AND TRADEMARK OFFICE
CERTIFICATE OF CORRECTION

PATENT NO. : 3,906,211
DATED : September 16, 1975
INVENTOR(S) : Arthur B. Glaser It is certified that error appears in the above-identified patent and that said Letters Patent are hereby corrected as shown below:

Column 11, lines 47-67 should read --

TABLE II

| Inputs $\Sigma_{5,6}$ | $C_5$ | $C'_5$ | Total Input Weight | Outputs $S_5$ | $S_6$ | $C_7$ | $C'_7$ | Carry Line Rules |
|---|---|---|---|---|---|---|---|---|
| 0 | 0 | 0 | 0 | 0 | 0 | 0 | 0 | |
| 0 | 1 | 0 | 1 | 1 | 0 | 0 | 0 | $C_7$ = "0" |
| 0 | 1 | 1 | 2 | 0 | 1 | 0 | 0 | |
| 1 | 0 | 0 | 1 | 1 | 0 | 0 | 0 | $C'_7$ = "0" |
| 1 | 1 | 0 | 2 | 0 | 1 | 0 | 0 | |
| 1 | 1 | 1 | 3 | 1 | 1 | 0 | 0 | |
| 2 | 0 | 0 | 2 | 0 | 1 | 0 | 0 | $C_7 = C'_5$ |
| 2 | 1 | 0 | 3 | 1 | 1 | 0 | 0 | |
| 2 | 1 | 1 | 4 | 0 | 0 | 1 | 0 | $C'_7$ = "0" |
| 3 | 0 | 0 | 3 | 1 | 1 | 0 | 0 | $C_7 = C_5$ |
| 3 | 1 | 0 | 4 | 0 | 0 | 1 | 0 | |
| 3 | 1 | 1 | 5 | 1 | 0 | 1 | 0 | $C'_7$ = "0" |

UNITED STATES PATENT OFFICE
CERTIFICATE OF CORRECTION

PATENT NO. : 3,906,211

DATED : September 16, 1975

INVENTOR(S) : Arthur B. Glaser

It is certified that error appears in the above-identified patent and that said Letters Patent are hereby corrected as shown below:

| | | | | | | | | |
|---|---|---|---|---|---|---|---|---|
| 4 | 0 | 0 | 4 | 0 | 0 | 1 | 0 | $C_7$ = "1" |
| 4 | 1 | 0 | 5 | 1 | 0 | 1 | 0 | |
| 4 | 1 | 1 | 6 | 0 | 1 | 1 | 0 | |

.--

Column 12, lines 1-19 should read --

TABLE II-Continued

| Inputs $\Sigma_{5,6}$ | $C_5$ | $C'_5$ | Total Input Weight | Outputs $S_5$ | $S_6$ | $C_7$ | $C'_7$ | Carry Line Rules |
|---|---|---|---|---|---|---|---|---|
| 5 | 0 | 0 | 5 | 1 | 0 | 1 | 0 | $C'_7$ = "0" |
| 5 | 1 | 0 | 6 | 0 | 1 | 1 | 0 | |
| 5 | 1 | 1 | 7 | 1 | 1 | 1 | 0 | |
| 6 | 0 | 0 | 6 | 0 | 1 | 1 | 0 | $C_7$ = "1" |
| 6 | 1 | 0 | 7 | 1 | 1 | 1 | 0 | $C'_7 = C'_5$ |
| 6 | 1 | 1 | 8 | 0 | 0 | 1 | 1 | |
| 7 | 0 | 0 | 7 | 1 | 1 | 1 | 0 | $C_7$ = "1" |
| 7 | 1 | 0 | 8 | 0 | 0 | 1 | 1 | $C'_7 = C_5$ |
| 7 | 1 | 1 | 9 | 1 | 0 | 1 | 1 | |

UNITED STATES PATENT OFFICE
CERTIFICATE OF CORRECTION

PATENT NO. : 3,906,211
DATED : September 16, 1975
INVENTOR(S) : Arthur B. Glaser It is certified that error appears in the above-identified patent and that said Letters Patent are hereby corrected as shown below:

| | | | | | | | | |
|---|---|---|---|---|---|---|---|---|
| 8 | 0 | 0 | 8 | 0 | 0 | 1 | 1 | |
| 8 | 1 | 0 | 9 | 1 | 0 | 1 | 1 | $C_7$ = "1" |
| 8 | 1 | 1 | 10 | 0 | 1 | 1 | 1 | |
| 9 | 0 | 0 | 9 | 1 | 0 | 1 | 1 | $C_7'$ = "1" |
| 9 | 1 | 0 | 10 | 0 | 1 | 1 | 1 | |
| 9 | 1 | 1 | 11 | 1 | 1 | 1 | 1 | .-- |

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*